United States Patent [19]
Pelfrey

[11] Patent Number: 5,284,227
[45] Date of Patent: Feb. 8, 1994

[54] DISC BRAKE ASSEMBLY AND BRAKE PAD FOR USE THEREWITH

[75] Inventor: Rick D. Pelfrey, Beavercreek, Ohio

[73] Assignee: Enginetics Brake Corporation, Huber Heights, Ohio

[21] Appl. No.: 902,533

[22] Filed: Jun. 22, 1992

Related U.S. Application Data

[63] Continuation of Ser. No. 633,987, Dec. 26, 1990, abandoned.

[51] Int. Cl.⁵ .............. F16D 25/0635; F16D 55/228; F16D 65/092
[52] U.S. Cl. ................. 188/71.1; 188/250 B; 192/70.15; 192/107 R
[58] Field of Search ............ 188/71.1, 71.6, 72.5, 188/72.4, 73.1, 73.31, 73.32, 250 B, 264 A, 264 AA, 244, 250 R, 71.71; 192/70.14, 70.15, 107 R

[56] References Cited

U.S. PATENT DOCUMENTS

| | | | |
|---|---|---|---|
| 987,337 | 3/1911 | Wright | 188/244 |
| 2,682,320 | 6/1954 | Chamberlain et al. | 188/71.6 |
| 2,684,133 | 7/1954 | Chester, Sr. | 188/244 |
| 2,862,580 | 12/1958 | Burnett . | |
| 2,937,722 | 5/1960 | Ruet | 188/72.5 |
| 2,973,837 | 3/1961 | Wilson . | |
| 3,132,724 | 5/1964 | Ansteth . | |
| 3,186,518 | 6/1965 | Rodway | 188/72.4 |
| 3,261,429 | 7/1966 | Burnett et al. . | |
| 3,277,985 | 10/1966 | Caskey . | |
| 3,310,135 | 3/1967 | Wells . | |
| 3,482,656 | 12/1969 | Shakespear . | |
| 3,500,969 | 3/1970 | Asher . | |
| 3,584,709 | 6/1971 | Conway | 188/72.5 X |
| 3,659,685 | 5/1972 | Stipanovic . | |
| 3,734,248 | 5/1973 | Fay . | |
| 3,791,492 | 2/1974 | Neilsen | 188/72.5 X |
| 3,840,093 | 10/1974 | Hamayasu | 188/250 B X |
| 3,951,241 | 4/1976 | Baxendale | 188/72.4 |
| 4,036,334 | 7/1977 | Brown . | |
| 4,064,974 | 12/1977 | Filderman . | |
| 4,093,043 | 6/1978 | Smith . | |
| 4,187,931 | 2/1980 | Balzer . | |
| 4,485,898 | 12/1984 | Bracken et al. . | |
| 4,609,079 | 9/1986 | Mery | 188/73.32 X |
| 5,117,949 | 6/1992 | Buckley et al. | 188/71.1 X |

FOREIGN PATENT DOCUMENTS

| | | | |
|---|---|---|---|
| 1251102 | 9/1967 | Fed. Rep. of Germany | 188/72.4 |
| 2100009 | 9/1971 | Fed. Rep. of Germany | 188/73.1 |
| 295032 | 11/1989 | Japan | 188/72.4 |

OTHER PUBLICATIONS

Tol-o-matic Caliper Disc Brake Catalog, published by Tol-o-matic, Inc., Minneapolis, Minn., copyright 1988, cover page, copyright notice page, and pp. 18, 22, 23, 46 and 47.

Primary Examiner—Robert J. Oberleitner
Assistant Examiner—Alfred Muratori
Attorney, Agent, or Firm—Thompson, Hine and Flory

[57] ABSTRACT

A disc brake assembly having enhanced brake efficiency and improved cooling includes a brake pad having arcuate upper and lower edges and a width that diminishes along its length from its leading edge to its trailing edge. A braking force is exerted on the brake pad by plural hydraulic actuators having pistons aligned with longitudinally spaced portions of the brake pad. The radial and circumferential locations of such portions are selected to minimize differences in the radial wear of the brake pad. The actuators are preferably symmetrically positioned with respect to a brake rotor centerline but may be positioned asymmetrically. The actuator pistons are confined for movement within close tolerances in order to limit the angle though which the brake pads can rock. Each brake pad is removably mounted on a pad carrier plate and cooperating sloping edges on the pad and on flanges on the carrier plate are used to hold the pad on the carrier plate and enable both the quick assembly and the quick disassembly of the pad and the carrier plate. The brake caliper includes a spacer assembly made from a stack of shims and having an internal air chamber opening to both cylinder housings for cooling. The air chamber is open to the front by plural air inlets and to the rear by plural air outlets. The inlets and outlets are offset from one another so that air entering the inlets must travel laterally before exiting through the outlets.

24 Claims, 3 Drawing Sheets

DISC BRAKE ASSEMBLY AND BRAKE PAD FOR USE THEREWITH

This is a continuation of application Ser. No. 07/633,987, filed Dec. 26, 1990, now abandoned.

SUMMARY OF THE INVENTION

This invention relates to a disc brake assembly and a brake pad for use therewith and is primarily intended for use on disc brakes having a single rotating brake disc or rotor connected to an axle for rotation therewith and straddled by a pair of brake pads forming parts of a caliper assembly. However, aspects of this invention may be useful in brake systems for other than automotive use and may be useful in brake systems having plural rotors.

The preferred embodiment of this invention was developed for use in relatively lightweight automotive vehicles, such as go-carts, snowmobiles, drag sleds and drag bikes, but, with appropriate selection of dimensions and materials, brake assemblies and pads in accordance with this invention may be used for both lighter duty and heavier duty applications.

The primary object of this invention is to enhance the braking efficiency of a disc brake assembly. A related object of this invention is to maintain a substantially uniform braking efficiency as the brake pads become worn due to repeated use.

More particularly, an object of this invention is to provide a disc brake assembly and a brake pad for use therewith with which the braking pressure applied to the brake rotor by a brake pad is substantially uniform over the entire inner or brake-engageable surface of the pad. In this connection a further object of this invention is to minimize the tendency, known as "dig-in", for a brake pad to rock on initial application of a braking force, such that its leading edge tilts toward and is drawn along the surface of the brake rotor, causing it to wear away more quickly than the other brake-engageable surfaces of the pad.

In another aspect of this invention, an object is to provide a brake pad assembly and a brake pad for use therewith so constructed that the pad may be removed and replaced with a minimum of disassembly and reassembly required.

Yet another object of this invention is to provide a disk brake assembly which may be economically manufactured that utilizes a pad of a relatively simple, one-piece construction.

The following terms have the meanings given for purposes of this description and the claims that follow.

"Brake pad" refers to a device, known also as a puck or brake lining, which has a surface confronting and engageable with the brake rotor by which braking pressure is applied to the brake rotor.

The "inner surface" of the pad is the surface that confronts and is engageable with the rotor and the "outer surface" is the opposite surface of the pad which faces away from the rotor.

The "leading edge" of the pad is the edge of the pad that faces in the direction opposite to the direction of the normal forward direction of rotor rotation. For example, the rotor in a go-cart has a normal forward direction during which the top of the rotor moves forwardly and the brake pad location is normally on the forward portion of the rotor. In such case, the leading edge faces upwardly This terminology is conventional in the industry and often the leading edge is referred to as the top or upper edge. As a corollary, the "trailing edge" is the oppositely facing edge and is the lower or bottom edge in the normal go-cart configuration. The "inner edge" of the pad is the edge that is closest to the center axis of the rotor while the "outer edge" is the edge that faces away from the axis of the rotor so that the outer edge is radially further from the rotor axis than the inner edge.

The "length" direction of the pad is the direction, which may be either a straight line or an arcuate line, from the leading edge to the trailing edge of the pad. The "width" direction of the pad refers to the direction from its inner edge to its outer edge or vice versa. In other words, the length of the pad is with reference to the length of the circumferential arc of the rotor that it covers and the width refers to the length of the radial lines of the rotor that it covers.

As well known to those familar with disc brakes, brake pads tend to wear unevenly with use, producing a condition known as longitudinal taper, wherein the leading end of the brake pad is worn thinner than its trailing end, and another condition, known as radial taper, wherein the outer edge of the brake pad is worn thinner than its inner edge. Both taper conditions cause a reduction in braking efficiency because of the lesser area of the brake pad useful for applying a braking pressure. Tapering of the pad also leads to early pad failure. Such tapering of the brake pads over a period of time when using brake assemblies and pads constructed in accordance with this invention is substantially reduced as compared to many brake systems in use today.

Another object of this invention is to provide an improved mounting for a brake pad enabling speedy assembly and removal of a brake pad.

Yet another object of this invention is to provide an improved caliper for an automotive disc brake having improved cooling properties.

In accordance with this invention, a brake pad is made from a matrix of high friction material having a uniform thickness and having a width that diminishes along its length from its leading edge to its trailing edge so that the leading edge is wider than the trailing edge and sweeps a greater portion of the brake rotor than the rest of the pad. Accordingly, the brake-engageable surface area of the pad is at its greatest in the areas that are most subject to wear and the frictional wear on the pad is spread more evenly over the length of the pad.

The inner edge and the outer outer edge of the brake pad are preferably in the form of uniformly continuous arcs, and more particularly in the form of substantially circular arcs having different radii and different centers so that the two arcs converge along their length from the leading edge to the trailing edge of the pad.

A brake pad of this invention preferably forms part of a brake pad assembly comprising the brake pad and a pad carrier plate on which the pad is removably supported. The pad carrier plate has the same general configuration as the brake pad and cooperating sloping inner and outer edges on the pad and pad-retaining flanges on the carrier plate are used to hold the pad on the carrier plate under spring pressure. Because the inner and outer edges of both the brake pad and the carrier plate, including its pad-retaining flanges, converge toward one another from their leading edges to their trailing edges, the pad can be quickly assembled on the carrier plate by placing the trailing edge of the pad on the leading edge of the carrier plate and then by sliding the pad along the carrier plate so that its trailing edge approaches the trailing edge of the carrier plate until the pad becomes wedged to the carrier plate. Removal of the pad from the carrier plate can be quickly and simply accomplished by pushing on the trailing edge of the pad so that it becomes unwedged from the carrier plate.

A safety flange is preferably provided on the trailing edge of the carrier plate to serve as a safety stop to prevent the pad from sliding off the carrier in the event the pad-retaining flanges overheat and lose their ability to retain the pad. The safety flange preferably projects further troward the brake rotor than the pad-retaining flanges so that the safety flange engages the rotor before a brake pad is fully worn in order to alert the driver in advance of the need to replace the pad before it becomes totally ineffective.

In accordance with a preferred embodiment of this invention, the braking force is exerted on the brake pad assembly by plural hydraulic actuators having pistons aligned, respectively, with longitudinally spaced portions of the brake pad. The radial locations of such portions are selected to minimize differences in the radial wear of the brake pad. Thus, these portions are located nearer the inner surface of a brake pad than its outer surface. For ease of manufacture, as will become apparent, the actuators are preferably symmetrically positioned with respect to a radial line extending therethrough. In a modification, the actuators are positioned asymmetrically in order to accommodate a pad design and location used to achieve a better braking efficiency.

Further in accordance with this invention, each of the hydraulic actuators includes a one-piece piston having one end portion surrounded by an O-ring seal slidable in a cylinder in a cylinder housing and having a second end portion rigidly connected to the pad carrier plate. To limit the effects of dig-in, bores in the cylinder housing axially aligned with the cylinders closely confine their second end portions so that each piston is accurately guided at two spaced points for its movement to and from the brake pad assembly along a predetermined axis.

It is known that a go-cart brake should have means for positively returning the brake pistons because a go-cart is so lightweight that any dragging of the brake pad on the rotor, except when a braking force is intentionally applied, undesirably lowers the speed of the go-cart. With prior brake constructions, the problem exists that the spring return mechanisms undesirably exerts uneven forces on the brake pad assembly. This problem is overcome in accordance with this invention by utilizing springs coiled about parts of the pistons and acting centrally thereon to provide for a positive return, thus avoiding the uneven appplication of return forces.

In an aspect of this invention especially for automotive use, a caliper assembly is provided that includes a spacer assembly connected to and spanning between a pair of cylinder housings, which spacer assembly comprises a body having an internal air chamber opening to both cylinder housings in order to cool the same. The air chamber is open to the front by plural air inlets and to the rear by plural air outlets. The inlets and outlets are offset from one another so that air entering the inlets must travel laterally before exiting through the outlets. This construction improves brake cooling and also helps to prevent debris from reaching the area of the brake pad.

Further, the spacer assembly preferably comprises a stack of two sets of spacer shims which are interleaved alternately with one another and so constructed as to form the body of the spacer assembly, incuding the air chamber and the air inlets and the air outlets. The shims of one set are larger than the other shims so that, when assembled, portions of the larger shims form cooling fins to further enhance the cooling effect of the spacer assembly.

Other objects and advantages will become apparent from the following description and the drawings.

BRIEF DESCRIPTION OF THE DRAWINGS

FIG. 2 also shows a fragment of the rotor in phantom lines and, in addition, diagramatically indicates how the surfaces of the brake pad assembly are generated.

DETAILED DESCRIPTION

Figure 1:
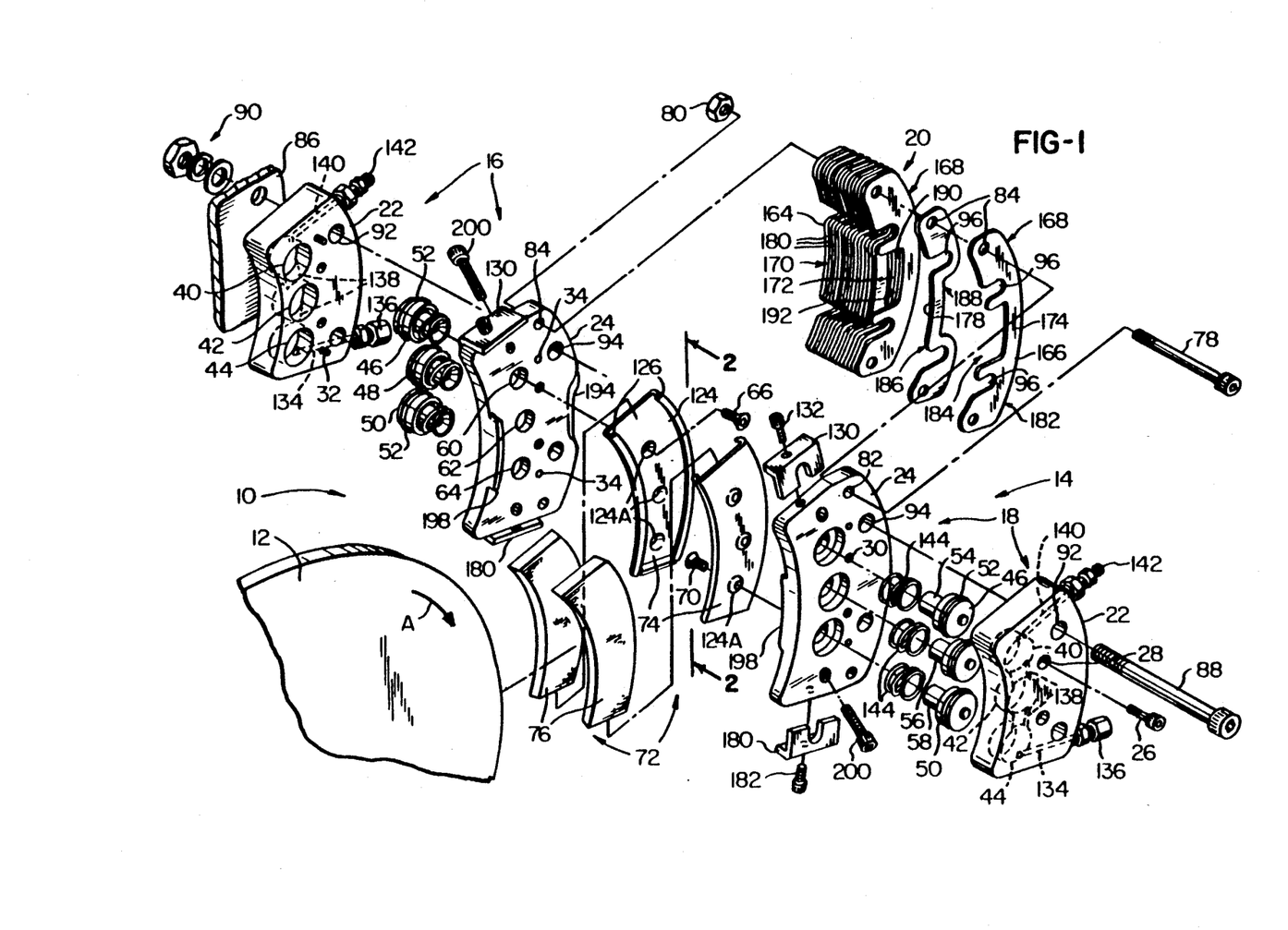
FIG. 1 is a fragmentary, exploded perspective view of a disc brake assembly in accordance with this invention.
Figures 2, 3, 4, 5:
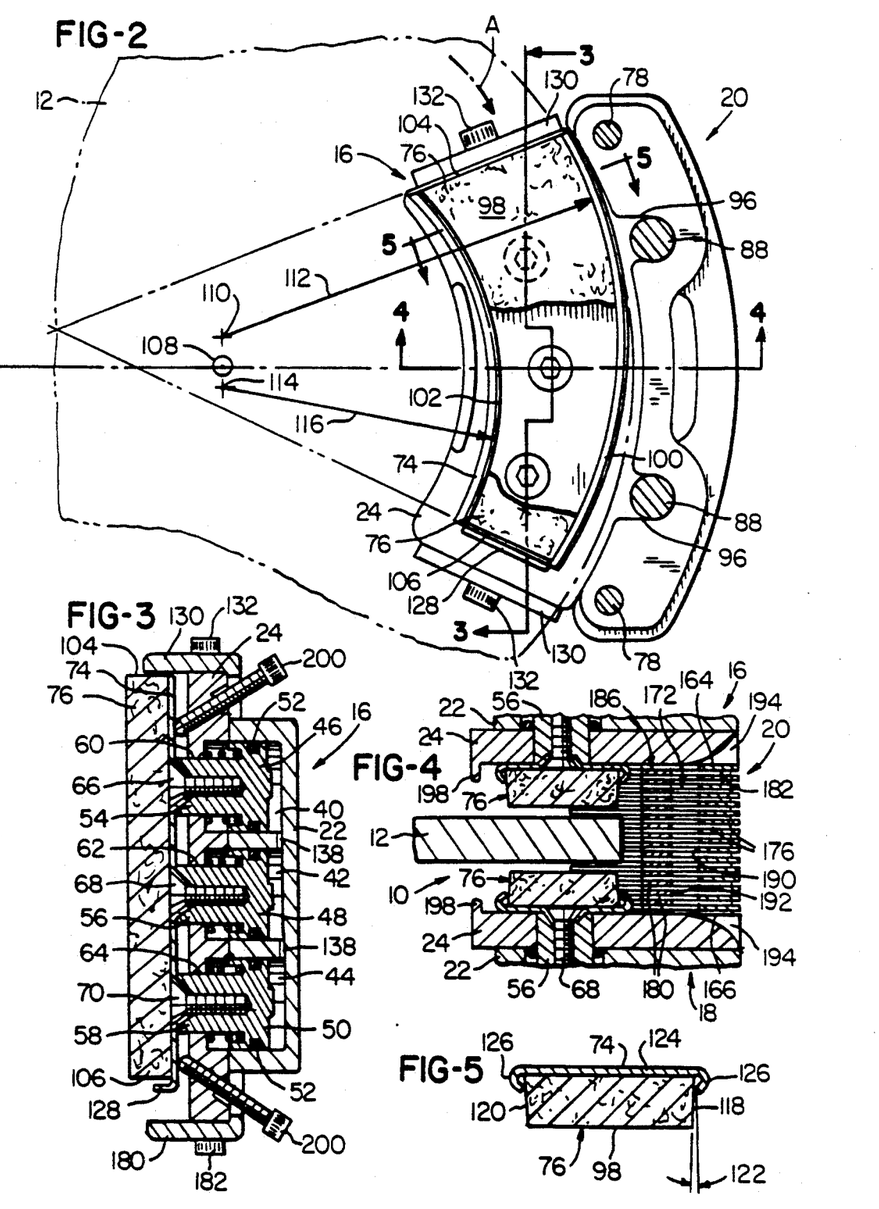
FIG. 2 is a cross-sectional view of the brake pad assembly of FIG. 1 with the left side pad assembly and cylinder housing shown in elevation as indicated by the arrows 2—2 of FIG. 1.
FIG. 3 is a longitudinal cross-sectional view of the left side pad assembly and cylinder housing taken along section line 3—3 of FIG. 2.
FIG. 4 is a cross-sectional view of the disc brake assembly of FIG. 1 taken on the radial center line thereof as indicated by section line 4—4 of FIG. 2.
FIG. 5 is a transverse, cross-sectional view of the left side pad assembly taken along section line 5—5 of FIG. 2.

With reference to FIGS. 1 and 4, a disc brake assembly in accordance with this invention is generally designated 10 and comprises a brake rotor 12 and a brake caliper assembly, generally designated 14. It will be understood that the rotor 12 is affixed to a rotary member, such as an axle (not shown) for a go-cart, for rotation therewith.

Caliper assembly 14 comprises a left side brake cylinder housing, generally designated 16, and a right side brake cylinder housing, generally designated 18. Brake cylinder housings 16 and 18 are held in spaced, mutually confronting relation by a spacer assembly, generally designated 20.

The two brake cylinder housings 16 and 18 are of the same construction and only one of the these housings, namely the left side housing 16, is described in detail herein. However, some aspects of construction are best understood by inspection of the depiction in the drawings of the right side housing 18, and like reference numbers apply to the parts of each housing 16 and 18.

With reference also to FIG. 3, the left side brake cylinder housing 16 comprises an outer caliper plate 22 and an inner caliper plate 24 connected to the outer caliper plate 22 in face-to-face abutting relationship by a pair of connecting screws 26 that extend through spaced bores 28 in the outer caliper plate 22 and into tapped holes 30 in the inner caliper plate 24. (Only one of screws 26 is shown in the drawings—see FIG.

1—and that one is for the right side caliper assembly 18.) Caliper plate 22 is referred to as the "outer" plate herein because it is further from the rotor 12 than the "inner" caliper plate 24. Interfitting locating pins 32 and bores 34 are provided for the purpose of assuring a proper alignment between the outer caliper plate 22 and the inner caliper plate 24.

There are three hydraulic cylinders 40, 42, and 44 bored in the inner face of the outer caliper plate 22. Cylinders 40, 42 and 44 slidably receive, respectively, rigid, one-piece pistons 46, 48 and 50 each surrounded by an O-ring sealing member 52 and each having a reduced diameter shank or piston rod, designated 54, 56 and 58, respectively. The piston rods 54, 56 and 58 slidably extend through apertures 60, 62 and 64, respectively, in the inner caliper plate 24. The free ends of the piston rods 54, 56 and 58 are countersunk and have tapped holes for rigid connection by flat-head screws 66, 68 and 70, respectively, to a brake pad assembly, generally designated 72, comprising a carrier plate 74 and a brake pad 76 mounted on the carrier plate 74.

The construction described has the advantage that the apertures 60, 62 and 64 can closely confine the piston rods 54, 56 and 58. For this reason, and because the pistons 46, 48 and 50 are each confined for movement at two points therealong, namely the point at which their O-ring seals 52 engage the inner surface of their respective cylinders 40, 42 and 44 and the point at which their piston rods 54, 56 and 58 are slidably received by the apertures 60, 62 and 64, the movements of the pistons 46, 48 and 50 are accurately restricted to their designed axes so that the angle through which the pad assembly 72 can rock or pivot from end-to-end, and thereby effects of pad dig-in, are highly restricted. As an example, for piston rods having a diameter of 0.495+0.002 inch, if the apertures 60, 62 and 64 are bored to a diameter of 0.500+0.001 inch, the longitudinal wear of the brake pad due to dig in is limited to 0.020 to 0.030 inch. A lubricating coating, such as teflon-graphite, is preferably applied to the pistons 46, 48 and 50 to minimize the wear that otherwise would be caused by such close tolerances.

The left and right side cylinder housings 16 and 18 and the spacer assembly 20 form a rigid, unitary structure. To this end, the left and right side inner caliper plates 24 and the spacer assembly 20 are rigidly held together by a pair of connecting bolts 78 with cooperating nuts 80 which bolts 78 pass through aligned apertures 82 in the inner caliper plates 24 and aperture 84 in the spacer assembly 20. The entire caliper assembly 14 is connected to a mounting bracket 86 by a pair of mounting bolts 88 with cooperating nuts and washers 90 that extend through apertures 92 in the outer caliper plates 22 and apertures 94 in the inner caliper plates 24 aligned therewith and also through channels 96 in the spacer assembly 20. In a go-cart configuration the caliper assembly 14 is mounted forwardly of the rotor 12 with the spacer assembly 20 facing the forward end of the vehicle and with the brake pads 76 positioned generally vertically.

Figure 6:
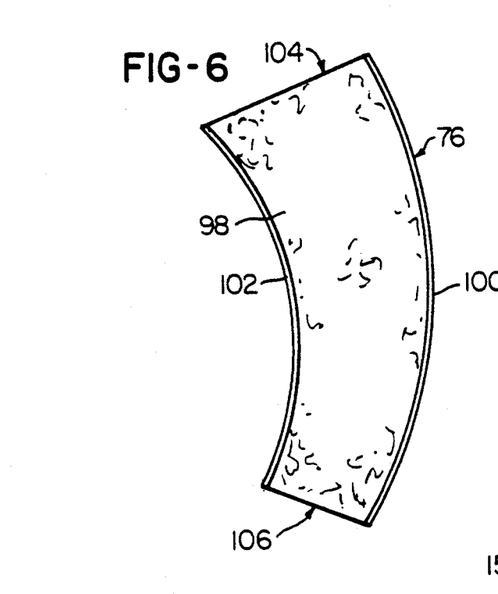
FIG. 6 is a plan view of a brake pad in accordance with this invention.

With reference to FIGS. 2, 3 and 6, the brake pad 76 comprises a uniformly thick matrix of high friction material which may be organic or other conventional material used for brake linings. In accordance with this invention, the width of the inner surface, designated 98, of the brake pad 76 tapers along its length so that its outer edge, designated 100, and its inner edge, designated 102, converge from its leading edge, designated 104, to its trailing edge, designated 106. As mentioned earlier, the surface area of the portion of a pad of conventional construction that experiences the most wear is its leading edge. It will be noted that the width of the pad 76 of this invention is at its maximum at its leading edge 104 and at a minimum at its trailing edge 106. Tests using this pad configuration have indicated that a pad 76 of this invention wears away more evenly than a pad of substantially uniform width or a pad which is symetrical about its radial center line.

With continued reference to FIG. 2, the center of the axle or the like to be braked is indicated by a circle 108 which is coincident with the axis of the rotor 12. The outer edge 100 of the inner pad surface 98 is preferably in the form of a circular arc generated about an axis 110 located slightly above the rotor center axis 108, as indicated by radial line 112. In contrast, the inner edge 102 of the surface 98 comprises a circular arc having a shorter radius and centered on an axis 114 located slightly below the rotor axis 108. The radius of the inner edge 102 is represented by line 116 in FIG. 2. As a result of this construction the width of the pad diminishes gradually from its leading edge to its trailing edge so that the area of the rotor engaged by the surface 98, which is conventionally known as the "swept area", is maximal at its leading edge 104 and the leading edge sweeps a greater portion of the rotor 12 than the rest of the surface 98.

The optimal pad shape will depend upon a variety of factors and would be determined by trial and error. In the preferred pad shape shown in FIG. 2, if an imaginary arc were drawn concentric to the outer edge 100 and intersecting the inner edge 102, the angle formed by such interesection would be 8°. Other pad constructions may have different angles of divergence depending upon the wear characteristics of the pad.

In FIG. 2 it may be noticed that the leading edge 104 and the trailing edge 106 of the pad surface 98 are not radial to the center axis 108 of the rotor 12. Rather these edges, if extended, would meet at a point well past the center axis 108 and, therefore, these edges are not so sharply angled from outwardly to inwardly of the surface 98.

As shown best in FIGS. 5 and 6, the brake pad 76 has an outer edge surface 118 and an inner edge surface 120 which diverge outwardly on the order of 3° from the inner pad surface 98 to its outer surface, as indicated by the angle 122 marked in FIG. 5. With reference to FIGS. 1, 2, and 5, the carrier plate 74 has a base plate 124 conforming generally to the shape of the inner and outer surfaces of the brake pad 76. Base plate 124 is planar, but for extruded and apertured screw-receiving pockets 124A that receive the flat-head screws 66, 68 and 70, and slidably receives the brake pad 76. Inwardly projecting, reentrant curved flanges 126 extend along the entire length of the outer and inner edges of the carrier base plate 124. The carrier plate 74 is preferably designed such that its outer and inner edges, which are concentric with the inner and outer edge surfaces of the brake pad 76, converge so that the width of the carrier plate 74 at its trailing end is less than the width of the trailing end of the brake pad 76. Accordingly, the pad 76 is wedged to the carrier plate 74 when assembled thereon and cannot be removed by simply pulling the pad 76 in a direction transverse to the carrier plate 74. Due to the inherent resiliency of the reentrant flanges 126, the pad 76 is held under spring tension so that vibration or looseness in the mounting of the pad is avoided.

During assembly (or reassembly) of a pad 76 onto carrier plate 76, the trailing end of the pad 76 is inserte between the flanges 126 adjacent the leading edge of the carrie plate 74 and slid along the carrier base plate 124 until the pad 7 is securely wedged to the carrier plate 74. In other words, as shown in FIG. 3, during assembly the pad 76 will be securely wedge to the carrier plate 74 before the trailing end of the pad 7 reaches the trailing end of the carrier 74. Following assembly there is a separation between the trailing end of the carrier plate 74 and the pad 76 wedged thereto.

In operation of the brake assembly 10 of this invention, the application of braking pressure to reduce the speed of normal forward direction of rotation of the brake rotor 12, which direction is indicated by arrows "A" in FIGS. 1 and 2, creates a frictional force tending to drive the brake pad 76 further toward the trailing edge of the carrier plate 74, which force is effectively resisted by the inner and outer carrier flanges 126.

In FIG. 3 it will be noted that there is an inwardly extending flange 128, termed a safety flange herein, along the trailing end of the carrier plate 74. This is provided as a safety measure to retain the pad 76 should it become dislodged from the carrier plate 74 due to an unexpected failure, such as could be caused by an overheating of the pad assembly that would cause the reentrant flanges 126 to lose their full strength. The safety flange 128 preferably projects further from the base of the carrier plate 74 than do the reentrant, pad-receiving flanges 126 so that the safety flange engages the brake rotor 12 before its associated brake pad 76 is fully worn in order to alert the driver in advance of the need to replace the pad before it becomes totally ineffective.

To preclude the possiblility that the pad 76 should accidently be pushed upwardly and thereby become disengaged from the carrier plate 74, which could happen in the event heavy braking pressure is applied during reverse movement of the rotor 12—as could happen during a reverse spin-out of a go-cart—an L-shaped brake pad retaining plate 130 is mounted on the upper edge of the inner caliper plate 24 by a bolt 132. The leg of the upper retaining clip 130 confronting the leading edge surface of the pad 76 is sufficiently close to such leading edge that the pad 76 can only be removed from the carrier plate by first removing the upper retaining clip 130. In a practical example, it may be required that the brake pad 76 be slid upwardly along the carrier plate 74 by 0.100 inch before it can be pulled transversely away from the carrier plate 74. In such case, it has been found safe to locate the surface of the leg of the retaining clip 130 facing the leading edge of the brake pad 0.070 inch from the the leading edge of the brake pad 76. The brake pad 76 is thereby precluded from sliding sufficiently far that it becomes loose from the carrier plate 74.

If the caliper assembly 14 of this invention were only to be used in a machine which drives the rotor 12 in a forward direction, the retaining clip 130 would be rendered unnecessary and, in such event, one could remove the brake pad 76 for inspection or replacement, with no other disassembly of parts, by the simple expedient of pushing upwardly on the trailing end of the brake pad 76 by tapping it with a suitable tool. As it is, when the rotor 12 is capable of reverse rotation, and the retaining clip 130 needed, the only disassembly required to enable inspection or replacement of the brake pad 76 is to remove the retaining clip 130 before pushing the brake pad 76 upwardly along the base of the carrier plate 74 as described above. Reassembly is just as simple, requiring only that the retaining clip 130 be replaced after a pad 76 or its replacement is assembled on the carrier plate 74 as described above.

Turning now to the mechanism for applying a braking force to the brake pad assembly 74, with reference to FIGS. 1 and 3, the outer caliper plate 22 forms a manifold by which hydraulic fluid may be forced into the outer ends of the hydraulic cylinders 40, 42 and 44. Thus, the outer caliper plate 22 has a fluid delivery passageway 134 to the outer end of which a fluid coupling 136 is threaded and which opens to the bottom of the cylinder 44, fluid conduits 138 are provided between the bottoms of the cylinders 40 and 42 and between the bottoms of cylinders 42 and 44, and a bleeder line 140 extends from the bottom of the cylinder 40 to an external bleeder fitting 142, which is, as convenvtional, used to bleed air from the hydralulic system.

Hydraulic fluid may be forced into the cylinders 40, 42 and 44 by operation of a master cylinder (not shown) responding to brake pedal pressure using any suitable hydraulic circuit. The particular caliper asssembly 14 illustrated in the drawings has coil springs 144 encircling the piston rods 54, 56 and 58 to provide for a positive spring return of the pistons 46, 48 and 50. Because the springs 144 encircle and thereby act centrally on the pistons 46, 48 and 50, they act evenly on the brake pad assembly 72. As previously noted, the coil springs 144 are important for use in a go-cart brake assembly but are otherwise considered to be optional and those familiar with the art will recognize that this invention may be used with brakes that do not have positive spring returns.

As best shown in FIGS. 2, 3 and 4, the cylinders 40, 42 and 44, and accordingly their pistons 46, 48 and 50, are of equal diameter and thereby exert mutually equal braking pressures upon the parts of the brake pad assembly 72 to which the pistons are connected.

In order further to minimize uneven wear of the pad 76 along its length, the arcuate spacings of the brake cylinders 40, 42 and 44 relative to one another and to the pad assembly 72 are determined by trial and error. In the example illustrated in FIG. 2, the center piston 48 is aligned with the horizontal centerline of the rotor 12 and the other pistons 40 and 44 are located equidistant therefrom. This will likely be the best condition in most, if not all, cases. It can be the most economical arrangement because the outer caliper plate 22 and the inner caliper plate 24 may be constructed to be symmetrical about the radial line that extends centrally therethrough so that the same plates may be used for both the left side and the right side of the caliper, thereby enabling considerable economies of manufacture. However, it is contemplated that embodiments of this invention could have unequal cylinder and piston spacings if needed to reduce uneven pad wear.

Further in accordance with this invention, the radial spacings of the brake pistons and cylinders are determined, partly by trial and error, so as to minimize uneven radial pad wear. As best shown in FIGS. 2 and 4, the brake pistons and cylinders are located closer to the inner edge surfaces 120 of the brake pads 76 than to their outer edge surfaces 118. By so doing, radial tapering resulting from uneven pad wear is reduced. It is believed that the wear properties are enhanced because more braking pressure is applied to the radially inner portions of the brake pads 76 than to their radially outer portions. If even braking pressures were applied, the outer edges would wear faster because they are spaced further from the rotor axis, and the linear speeds of areas of the rotor relative to the pad increase as the radial separation from the rotor axis increases.

At the present time, the preferred spacing of the center axes of the brake pistons from the inner edge of the brake pad 76 is on the order of 40% to 45% of the radial distance from the inner pad edge 102 to the outer pad edge 100. In one practical example, the center axis of the center piston 48 is located at 44.5% and the centerlines of the upper and lower pistons 46 and 50 are spaced from the inner edge of the pad 76 by a distance equal to 40% of the total width at their respective points of connection to the pad carrier 74. This is the construction illustrated in FIG. 2. It will be noted that this construction has the advantage mentioned above that the inner caliper plates 22 and the outer caliper plates are symmetrical about their radial centerlines.

Figure 7:
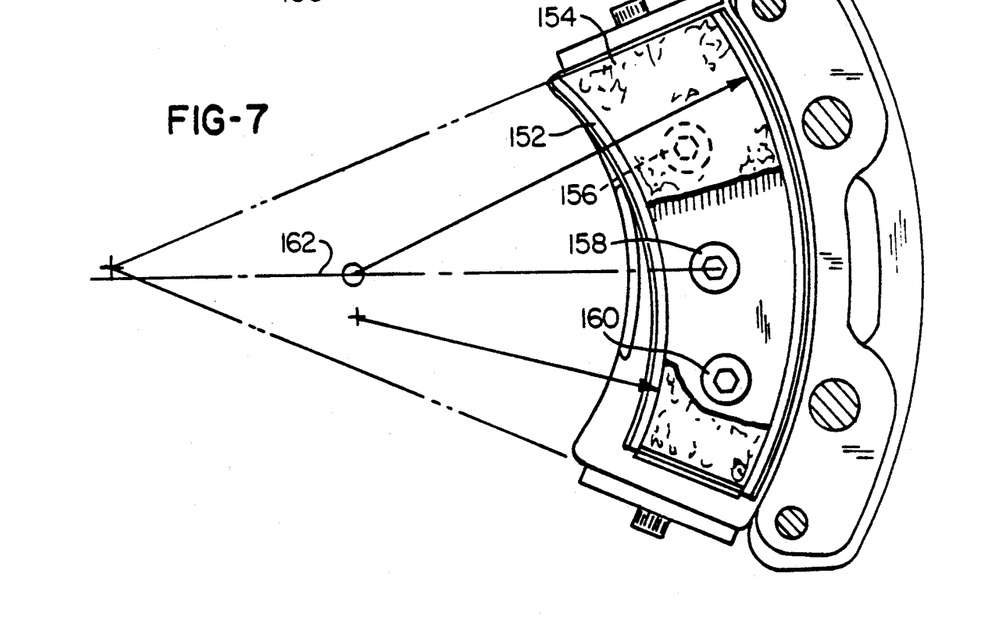
FIG. 7 is a view similar to FIG. 2 but showing a modification.

In a modification, illustrated in FIG. 7, a brake pad carrier 152 for a brake pad 154 is supported by three pistons (not shown) connected to the carrier 152 by screws 156, 158 and 160 aligned therewith. In this case, the outer edge of the carrier 152 is concentric with and closely adjacent the outer edge of a brake rotor (not shown) having a horizontal centerline 162. This provides an advantage in that the entire outer edge of the brake pad 154 is close to the outer edge of the rotor so that the braking efficiency is improved in contrast the the embodiment of FIGS. 1 through 6 wherein the outer edge of the brake pad at its leading end is closer to outer margin of the rotor but diverges away from the outer edge of the rotor. The radial positions of the pistons in the modification of FIG. 7 are selected to accommodate the changed location of the brake pad 154, again to locate the pistons somewhat nearer the inner edge of brake pad 154 than its outer edge. As previously indicated, the exact locations of the pistons will be determined by trial and error for most uniform wear.

In FIG. 7, it may be observed that the width of the pad 154 at its trailing end relative to its width at its leading end is greater than the pad 76 of FIG. 2. This is because the trailing end of the pad 154 FIG. 7 would undergo greater wear than the pad 76 of FIG. 2 because the trailing end of the pad of FIG. 7 is closer to the outer margin of the brake rotor. To obtain the difference in shape between the pads of FIG. 2 and FIG. 7, the inner and outer surfaces of the pad 154 of FIG. 7 converge from its leading edge to its trailing edge by approximately 4° or 5° rather than by the approximately 8° convergence of the pad of FIG. 2. In practice, these edges could diverge by as little as 3° or as much as 15°.

It is clearly observable in FIG. 7 that the brake pad of FIG. 7 is assymmetrical with respect to the horizontal centerline 162, which is also the centerline of the cylinder housing of the brake caliper of FIG. 7. Thus, there is a greater length of the pad 154 above than below the horizontal centerline 162. The same condition obtains with the pad 76 of FIG. 2, but it not so clearly evident. This condition, which may not always obtain, results from the desirablilty of making the leading edge of the pad as wide as possible (as permitted by factors such as the construction of the rotor and the space available for the brake caliper). The design of the rest of the pad is then determined by application of the principles discussed above to achieve substantially uniform brake pad wear.

With reference to FIGS. 1, 2 and 4, the spacer assembly 20 spanning between said cylinder housings 16 and 18 comprises a first end wall 164 engaging the inner face of the left side inner caliper plate 24 and a second end wall 166 engaging the inner face of the right side inner caliper plate 24. Spacer assembly 20 further has an outer surface 168 and an inner surface 170 spanning between the inner caliper plates 24.

An air chamber 172 inside the spacer body extends between its end walls 164 and 166 in spaced relation to its outer surface 168 and its inner surface 170. The outer surface 168 is formed from plural outer wall segments 174 separated by plural air inlets 176 extending from the outer surface 168 to the air chamber 172 and the inner surface 170 comprises plural inner wall segments 178 separated by plural air outlets 180 extending between the air chamber 172 and the inner surface 170. The air inlets 176 are laterally offset from the air outlets 180 so that air entering the air chamber 172 through the air inlets 176 must travel laterally through the air chamber 172 before exiting through the air outlets 180.

The spacer assembly 20 preferably is made from a stack of thin, blade-like spacer shims, their number being determined by the necessary spacing between the cylinder housings 16 and 18. The shims comprise a first set of mutually identical shims 182 having centrally located recesses 184 in their inner edges and a second set of mutually identical shims 186 having centrally located recesses 188 in their outer edges. The shims 182 of the first set are stacked alternately with the shims 186 of the second set. The outer wall segments 174 are formed by the first set of shims 182 and the outermost surface, designated 190, of the air chamber 172 is formed by the recessed surfaces thereof. The inner wall segments 178 are formed by the second set of shims 186 and the innermost surface, designated 192, of the air chamber 172 is formed by the recessed surfaces thereof. Accordingly, the air inlets 176 are formed between adjacent ones of the shims 182 of the first set and the air outlets 180 are formed bewtween adjacent ones of the shims 186 of the second set.

Shims 182 of the first set of shims are somewhat larger in area than the shims 186 of the second set so that they are effective to form cooling fins extending along the outer surface 168 of the spacer assembly 20.

As will be appreciated by those familiar with disc brakes, the spacer assembly of this invention will create turbulent air flow in the brake caliper, with the air inlets and the air outlets, due to their restricted size, channeling the air impinging on the spacer assembly at high velocities. The spacer assembly 20 provides for efficient cooling of the caliper because of the large surface area resulting from its finned construction. Here it may be noted that the center of the leading inner surface of the inner caliper plates 24 are believed or recessed as shown at 194, to direct air thereover into the air chamber 172 in order to enhance cooling. See FIG. 4.

Another advantage of the spacer assembly 20 of this invention is that it acts as a screen to minimize the opportunity for debris to impinge upon the area of the brake pads. Of course, the spacer assembly 20 of this invention is most useful in caliper assemblies so mounted that its spacer assembly faces the front of the vehicle on which it is mounted so as to be directly in the path of the oncoming air.

With reference to FIGS. 1 and 3, a pair of adjusting screws 200 extend angularly through the inner caliper plate 24 and bear against the outer face of the carrier plate 74 and may be used, as is well known, to adjust for brake pad wear. The illustration of the adjusting screws is simplified because locking keys or the like used with the adjusting screws, as is conventional, are not illustrated.

Contributing to the turbulence of the air flow is a flange 198 projecting inwardly from the the rear face of the inner caliper plate 24 which deflects any air impinging upon it. Flange 198 may also serve to retain the brake pad within the confine of the caliper in the event of a mechanical failure resulting in the pad becoming disconnected from the carrier plate. Also for purposes of safety, a lower retaining clip 180 having an inwardly projecting leg is mounted on the lower edge of the inner caliper plate 24 by a bolt 182.

Although the presently preferred embodiment of this invention has been described, it will be understood that within the purview of this invention various changes may be made within the scope of the following claims. For example, the caliper 14 of this invention is fixed to the frame of the vehicle and has pistons on both sides of the rotor to apply braking pressure to the rotor. However, the brake pads of this invention could be used with advantage in a floating caliper, i.e., a caliper which has only one cylinder housing with hydraulic actuators used to press a brake pad on one side against the rotor, the brake pad on the opposite side being pulled toward the rotor because of the floating action of the caliper.

Other modifications that may be advantageous would be to construct the brake housing with either two brake cylinders or more than three brake cylinders. Two cylinders on each side presently is deemed to be inferior to, but may be less expensive than, three cylinders, but there may be applications in which two cylinders would be technically acceptable. Brake calipers having four or more cylinders on each side may provide technical advantages but may not be cost effective.

I claim:

1. A disc brake assembly for a vehicle comprising:
 a rotor;
 a pair of mutually confronting cylinder housings; a pair of mutually confronting brake pad assemblies mounted on said cylinder housings on opposite sides of said brake rotor;
 a spacer assembly connected to and spanning between said cylinder housings;
 each of said brake pad assemblies having only a single, unitary brake pad adapted to engage a surface of said brake rotor;
 each of said brake pads having a width in a radial direction of said rotor that tapers along a length of said pad from a leading edge, which is first swept by said rotor when rotating in a forward direction, to a trailing edge thereof;
 means for mounting said disc brake assembly on an associated vehicle such that said leading edge is swept first by said rotor when said rotor rotates in a forward direction, such that a portion of each said pad adjacent to said leading edge sweeps a greater area of said rotor than a remainder of each said pad;
 a plurality of cylinder members formed in each of said cylinder housings and longitudinally spaced along said housing; and
 a plurality of pistons included in said cylinder members said pistons being connected to said brake pad assembly, whereby orientation of said pads relative to said vehicle promotes even wear of said pads.

2. The brake assembly of claim 1 wherein said cylinder members are positioned relative to each said brake pad nearer to a radially inner edge of said brake pad than to an outer edge thereof.

3. The brake assembly of claim 2 wherein adjacent pairs of said cylinder members are equally spaced and symmetrically disposed about a radial centerline of an associated one of said cylinder housings.

4. The brake assembly of claim 2 wherein adjacent pairs of said cylinder members are equally spaced and asymmetrically disposed about a radial centerline of an associated cylinder housing.

5. The brake assembly of claim 2 wherein each of said cylinder members is spaced from said inner edge by approximately 40% to 45% of the length of a radial line segment extending from said inner edge to said outer edge and passing therethrough.

6. The brake assembly of claim 1 wherein at least one of said cylinder members is farther from an axis of rotation of said rotor than is at least one other of said cylinder members.

7. The brake assembly of claim 1 wherein each said brake pad assembly further comprises a brake pad carrier on which each said brake pad is mounted, each said brake pad carrier comprising a plate having a pad-support surface shaped to conform generally to the shape of each said pad and means removably mounting each said pad on each said pad-support surface, and further comprising means for connecting each said brake pad carrier to each of said pistons.

8. The brake assembly of claim 7 wherein each said carrier plate has plural apertures extending therethrough and wherein said connecting means comprises screws extending through said apertures and into said pistons.

9. The brake assembly of claim 8 wherein said pistons are guided by said cylinders at two longitudinally spaced locations in order to limit the angle through which said carrier plates and thereby said brake pad assemblies, can rock.

10. The brake assembly of claim 9 wherein each of said pistons comprises a larger diameter end portion confined for movement within one of said cylinders and a smaller diameter rod extending through said cylinder housing and wherein one of said spaced locations is along said one of said cylinders and the other of said spaced locations is within the portion of said cylinder housing through which said piston rod extends.

11. A caliper assembly for a disc brake assembly comprising a pair of mutually confronting caliper housings adapted to support a pair of mutually confronting brake pad assemblies on opposite sides of a rotor and a spacer assembly connected to and spanning between said cylinder housings, said spacer assembly comprising:
 a spacer body having a first end wall engaging one of said cylinder housings and a second end wall engaging the other of said cylinder housings;
 an outer surface spanning between said cylinder housings;
 an inner surface spanning between said cylinder housings;
 an air chamber inside said spacer body extending between said end walls in spaced relation to said outer surface and said inner surface, said outer surface being formed from plural outer wall segments separated by plural air inlets extending from said outer surface to said air chamber and said inner surface comprising plural inner wall segments separated by plural air outlets, said air inlets being laterally offset from said air outlets so that air entering said chamber through said air inlets must travel laterally through said chamber before exiting through said air outlets.

12. The caliper assembly of claim 11 wherein said spacer assembly comprises a stack of spacer shims, said shims comprising a first set of shims having recesses in their inner edges and a second set of shims having recesses in their outer edges, said shims of said first set of shims being stacked alternately with said shims of said second set of shims, said outer wall segments being formed by said first set of shims and the outermost surface of said air chamber being formed by the recessed surfaces thereof, said inner wall segments being formed by said second set of shims and the innermost surface of said air chamber being formed by the recessed surfaces thereof, said air inlets being formed between adjacent ones of said first set of shims and said air outlets being formed between adjacent ones of said second set of shims.

13. The caliper assembly of claim 11 wherein parts of the mutually confronting surfaces of said cylinder housings abutted by said spacer assembly have recesses opening to said air chamber.

14. A disc brake assembly comprising:
a rotor;
a cylinder housing;
a brake pad carrier displaceably mounted on said housing;
said brake pad carrier having a single, unitary brake pad being tapered in width along its length, said brake pad having an inner surface positioned adjacent to piston means, mounted on said housing, for displacing said pad into engagement with said rotor;
means for mounting said disk brake assembly on an associated vehicle such that a leading edge of said pad, which is first swept by said rotor when rotating in a forward direction, is wider than a trailing edge of said pad, so that said taper is oriented in a direction of forward rotor rotation such that an area of said pad adjacent to said leading edge is greater than an area adjacent to said trailing edge, whereby even wear of said inner surface is promoted.

15. The brake assembly of claim 14 wherein a radially outer edge of said pad is arcuate in shape, having a first radius of curvature, and an arcuate, radially inner edge of said pad has a second radius of curvature shorter than said first radius, and wherein a center of said arc of said outer edge is spaced from the center of said arc of said inner edge.

16. The brake assembly of claim 14 wherein said brake pad is uniformly thick.

17. The brake assembly of claim 14 wherein a radially inner edge of said pad tapers toward a radially outer edge thereof by an angle of between about 3 degrees to about 15 degrees along a length of said pad.

18. The brake assembly of claim 17 wherein said taper is approximately 8 degrees.

19. The brake assembly of claim 14 wherein said brake pad carrier comprises a plate having a pad-support surface shaped to conform generally to the shape of said pad and means removably mounting said pad on said pad-support surface.

20. The brake pad assembly of claim 19 wherein said pad-support surface has apertured screw-receiving pockets to enable said carrier plate to be connected to pistons by means of screws having heads located within said pockets.

21. The brake assembly of claim 14 wherein said pad includes a radially inner edge surface, and a radially outer edge surface said surfaces being bevelled outwardly from an inner, brake-engaging surface of said pad, and wherein said brake pad carrier includes complementary pad-support surfaces shaped so that said pad is wedged by said complementary surfaces into engagement with said edge surfaces and so that said pad is freed from said carrier plate by sliding said pad in a direction opposite that of said taper.

22. The brake pad assembly of claim 21 wherein the bevel angle of both said outer edge surface and said inner edge surface of said pad is approximately 3 degrees.

23. The brake assembly of claim 14 wherein said piston means is positioned, relative to said pad, to apply greater force to said trailing edge than to said leading edge.

24. The brake assembly of claim 23 wherein said piston means is offset longitudinally along said pad from a geometric center of said pad toward said trailing edge.

* * * * *